United States Patent
M. R. et al.

(10) Patent No.: US 10,291,496 B1
(45) Date of Patent: May 14, 2019

(54) PACKET CAPTURE BASED CAPTURING OF PROTOCOL LAYER STATE INFORMATION

(71) Applicant: Juniper Networks, Inc., Sunnyvale, CA (US)

(72) Inventors: Ananda Kumar M. R., Mysore (IN); Sameer Seth, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 503 days.

(21) Appl. No.: 14/869,011

(22) Filed: Sep. 29, 2015

(51) Int. Cl.
*H04L 12/26* (2006.01)

(52) U.S. Cl.
CPC .......... *H04L 43/062* (2013.01); *H04L 43/045* (2013.01)

(58) Field of Classification Search
CPC combination set(s) only.
See application file for complete search history.

(56) References Cited

U.S. PATENT DOCUMENTS

| | | | | |
|---|---|---|---|---|
| 4,625,081 | A * | 11/1986 | Lotito | H04M 3/5316 379/196 |
| 9,270,643 | B2 * | 2/2016 | Sahita | H04L 63/1416 |
| 9,313,126 | B2 * | 4/2016 | Dolson | H04L 43/12 |
| 2009/0238071 | A1 * | 9/2009 | Ray | H04L 47/10 370/235 |
| 2010/0034083 | A1 * | 2/2010 | Prakash | H04W 28/18 370/230.1 |
| 2010/0057932 | A1 * | 3/2010 | Pope | H04L 69/16 709/236 |
| 2011/0176419 | A1 * | 7/2011 | Draznin | H04L 43/0876 370/230.1 |
| 2015/0007316 | A1 * | 1/2015 | Ben-Shalom | H04L 63/1416 726/23 |
| 2015/0036493 | A1 * | 2/2015 | Cj | H04L 12/4641 370/235 |
| 2015/0222554 | A1 * | 8/2015 | Xu | H04L 47/2483 370/353 |

OTHER PUBLICATIONS

Wikipedia, "tcpdump", https://en.wikipedia.org/wiki/Tcpdump, Aug. 3, 2015, 3 pages.
Wikipedia, "netstat", https://en.wikipedia.org/wiki/Netstat, Sep. 28, 2015, 5 pages.
Wikipedia, "DTrace", https://en.wikipedia.org/wiki/DTrace, Sep. 22, 2015, 5 pages.
Wikipedia, "Wireshark", https://en.wikipedia.org/wiki/Wireshark, Sep. 1, 2015, 5 pages.

* cited by examiner

*Primary Examiner* — Uzma Alam
(74) *Attorney, Agent, or Firm* — Harrity & Harrity, LLP

(57) ABSTRACT

A device may determine a set of network traffic monitoring parameters associated with identifying a packet for capture. The set of network traffic monitoring parameters may identify a particular protocol layer at which to perform packet capture. The device may configure packet capture and protocol layer state determination based on the set of network traffic monitoring parameters. The device may perform packet capture of the packet at a time when the packet is received at a protocol stack associated with the particular protocol layer based on configuring packet capture and protocol layer state determination. The device may determine a protocol layer state at the time when the packet is received at the protocol stack based on configuring packet capture and protocol layer state determination. The device may provide information identifying the packet and/or the protocol layer state.

20 Claims, 12 Drawing Sheets

710 {
User input:
jpdump --proto tcp --port 22 --pstate "inpcb.inp_eflags, inpcb.inp_socket.so_state, inpcb.inp_socket.so_type, inpcb.inp_socket.so_snd.sb_cc,
inpcb.inp_socket.so_rcv.sb_cc, inpcb.inp_ppcb.t_state, inpcb.inp_ppcb.snd_nxt, inpcb.inp_ppcb.rcv_nxt"

Output:

720 {
HEADER dump: OUT: packet number: 20: (data left in cluster: 184 bytes)
Time: 2015-04-09 10:40:02.449658
IP[V/H]:4:5 IPTL: 116 IPID: 0 IPP: 6 IPSA: 10.209.5.165 IPDA: 10.209.152.165
TCPSP: 22 TCPDP: 60433 TCPS: 2163372713:2163372777(64) TCPA: 1935027375 TCPO: 8
TCPF: 0x18 ( PUSH ACK)
HEADER dump: Done 730 {
Proto state dump: Start
[0]: inpcb.inp_eflags : [ 8192 ]
[1]: inpcb.inp_socket.so_state : [ 258 ]
[2]: inpcb.inp_socket.so_type : [ 1 ]
[3]: inpcb.inp_socket.so_snd.sb_cc : [ 112 ]
[4]: inpcb.inp_socket.so_rcv.sb_cc : [ 0 ]
[5]: inpcb.inp_ppcb.t_state : [ 4 ]
[6]: inpcb.inp_ppcb.snd_nxt : [ 2163372777 ]
[7]: inpcb.inp_ppcb.rcv_nxt : [ 1935027375 ]
Proto state dump: Done 740 {
HEADER dump: IN: packet number: 21: (data left in cluster: 92 bytes)
Time: 2015-04-09 10:40:02.459557
IP[V/H]:4:5 IPTL: 52 IPID: 57477 IPP: 6 IPSA: 10.209.152.165 IPDA: 10.209.5.165
TCPSP: 60433 TCPDP: 22 TCPS: 1935027375:1935027375(0) TCPA: 2163372713 TCPO: 8
TCPF: 0x10 ( ACK)
HEADER dump: Done 750 {
Proto state dump: Start
[0]: inpcb.inp_eflags : [ 8192 ]
[1]: inpcb.inp_socket.so_state : [ 258 ]
[2]: inpcb.inp_socket.so_type : [ 1 ]
[3]: inpcb.inp_socket.so_snd.sb_cc : [ 112 ]
[4]: inpcb.inp_socket.so_rcv.sb_cc : [ 0 ]
[5]: inpcb.inp_ppcb.t_state : [ 4 ]
[6]: inpcb.inp_ppcb.snd_nxt : [ 2163372777 ]
[7]: inpcb.inp_ppcb.rcv_nxt : [ 1935027375 ]
Proto state dump: Done

PACKET CAPTURE BASED CAPTURING OF PROTOCOL LAYER STATE INFORMATION

BACKGROUND

A network device may monitor a network interface to determine information regarding incoming and/or outgoing packets at the network interface. The network device may process a packet to determine header information associated with the packet, and may select one or more packets for further analysis based on the header information. The network device may provide information regarding the network interface, for display to a user, based on monitoring the network interface.

SUMMARY

According to some possible implementations, a device may include one or more processors. The one or more processors may determine a set of network traffic monitoring parameters associated with identifying a packet for capture. The set of network traffic monitoring parameters may identify a particular protocol layer at which to perform packet capture. The one or more processors may configure packet capture and protocol layer state determination based on the set of network traffic monitoring parameters. The one or more processors may perform packet capture of the packet at a time when the packet is received at a protocol stack associated with the particular protocol layer based on configuring packet capture and protocol layer state determination. The one or more processors may determine a protocol layer state at the time when the packet is received at the protocol stack based on configuring packet capture and protocol layer state determination. The one or more processors may provide information identifying the packet and/or the protocol layer state.

According to some possible implementations, a non-transitory computer-readable medium may store instructions that, when executed by one or more processors, may cause the one or more processors to determine a set of network traffic monitoring parameters associated with identifying a packet for capture. The set of network traffic monitoring parameters may identify a particular protocol layer at which to perform packet capture. The one or more instructions, when executed by the one or more processors, may cause the one or more processors to establish a hook to obtain a packet at a time when the packet is received at a connection associated with the particular protocol layer. The one or more instructions, when executed by the one or more processors, may cause the one or more processors to establish a data structure to receive a set of values associated with a protocol layer state at the time when the packet is received at the connection associated with the particular protocol layer. The one or more instructions, when executed by the one or more processors, may cause the one or more processors to perform, using the hook for obtaining the packet, packet capture of a packet at the time when the packet is received at the connection associated with the particular protocol layer. The one or more instructions, when executed by the one or more processors, may cause the one or more processors to determine, using the data structure, the protocol layer state at the time when the packet is received at the connection associated with the particular protocol layer.

According to some possible implementations, a method may include configuring, by a device, packet capture to occur when a packet is received at a connection associated with a protocol stack of a particular protocol layer. The method may include configuring, by the device, protocol layer state determination to occur for the particular protocol layer when the packet is received at the connection. The method may include performing, by the device, packet capture of the packet when the packet is received at the connection and after configuring packet capture and configuring protocol layer state determination. The method may include determining, by the device, a protocol layer state of the particular protocol layer when the packet is received at the connection and after configuring packet capture and configuring protocol layer state determination.

BRIEF DESCRIPTION OF THE DRAWINGS

FIG. 7 is a diagram of an example implementation relating to the example process shown in FIG. 4.

DETAILED DESCRIPTION

The following detailed description of example implementations refers to the accompanying drawings. The same reference numbers in different drawings may identify the same or similar elements.

A network device may receive network traffic from a source network device and/or provide network traffic to a destination network device. The network device may capture a packet at a network interface (e.g., an outgoing network packet, an incoming network packet, or the like). For example, a particular network device may analyze each incoming and outgoing packet at a particular monitored network interface to identify header information, and may determine whether the packet matches a filtering criteria. In this case, the particular network device may provide information regarding packets that match the filtering criteria. The particular network device may determine a state of the network interface based on determining that a particular packet matches the filtering criteria.

However, performing an analysis on header information of each packet may require excess processing resources that may be unavailable to the network device. Moreover, information obtained regarding a state of the network interface at a time when a packet is processed may be different than information obtained at a time when the packet enters or exits a protocol stack associated with the network interface (e.g., when the packet is received at a connection of the network device). Implementations, described herein, may facilitate packet capturing at a particular protocol layer and a determination of information regarding a protocol layer state when the packet is received at a connection. In this way, a network device may facilitate improved debugging and/or configuration of the network device based on providing information regarding a protocol layer state that more accurately represents the network device, relative to protocol layer state information determined after the packet is processed.

Figure 1:
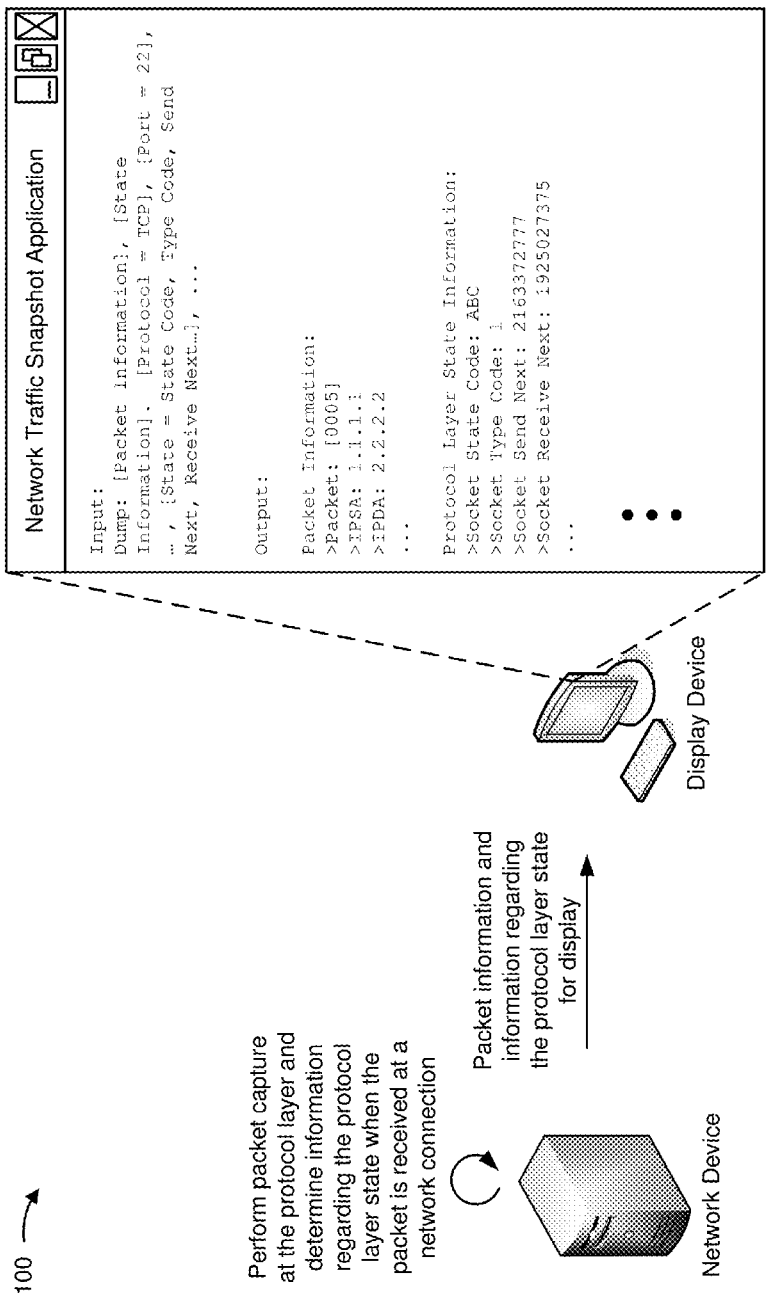
FIG. 1 is a diagram of an overview of an example implementation described herein.

FIG. 1 is a diagram of an overview of an example implementation 100 described herein. As shown in FIG. 1, example implementation 100 may include a network device and a display device.

With regard to FIG. 1, the network device may determine a set of network traffic monitoring parameters. The network device may establish a hook for performing packet capture at a particular location in a protocol stack based on the set of network traffic monitoring parameters. For example, the network device may configure packet capture at the transport control protocol (TCP) layer. The network device may configure copying of the packet when the packet is received at the particular location in the protocol stack. For example, the network device may cause a set of connections to point to a packet capture block, and may cause the packet capture block to point to a raw socket from which a copy of the packet may be obtained for processing. In this way, the network device configures packet capture. The network device may identify a set of values that are to be obtained for protocol layer state information based on the set of network traffic monitoring parameters. The network device may cause a data structure to be associated with a set of memory locations at which the set of values are stored. For example, the network device may determine a memory location at which the network device stores a socket state associated with the TCP layer connection, and may configure the data structure to receive a value from the memory location for storage when a packet is received at the TCP layer connection. In this way, the network device configures capture of information regarding a protocol layer state.

As further shown in FIG. 1, the network device may perform packet capture and may obtain information regarding a protocol layer state when the packet is captured. For example, the network device may cause the packet (or a portion of the packet) to be copied, and may obtain information regarding the packet from the copy. Moreover, the network device may cause values to be stored via the data structure (e.g., that is configured to receive the values when determining a protocol layer state) at a time when the packet is captured. The network device may provide information for display. For example, the network device may provide, for display, information regarding the packet, such as information identifying a source address of the packet (e.g., "IPSA: 1.1.1.1"), information identifying a destination address of the packet (e.g., "IDSA: 2.2.2.2"), or the like. The network device may provide, for display, information regarding the protocol layer state when the packet was captured. For example, the network device may provide information identifying a socket state code (e.g., a reference code identifying a socket state for the monitored connection), a socket type (e.g., a type code identifying the type of monitored connection), or the like.

In another example, the network device may alter a configuration of the network device based on determining the information regarding the protocol layer state. For example, the network device may determine that a particular value for the network device, when the packet was captured, does not match a desired value, and may determine an adjustment to the network device to cause the value to match the desired value. In this case, the network device may perform the adjustment, thereby improving performance of the network device. In another example, the network device may receive input, such as via a user interface, associated with causing an adjustment to improve performance of the network device. In another example, the network device may cause an alteration to a configuration of a network based the information regarding the protocol layer state.

In this way, a network device obtains information regarding a protocol layer state at a time when a packet is received at a monitored connection, thereby facilitating providing protocol layer state information that more accurately reflects the monitored connection when the packet is received relative to providing protocol layer state information obtained when the packet is processed (at a time after the packet is received). Moreover, the network device may facilitate improved debugging and/or configuration of the network device based on providing information that more accurately reflects the monitored connection relative to debugging and/or configuration performed based on information that less accurately reflects the monitored connection (e.g., information obtained after the packet is received).

Figure 2:
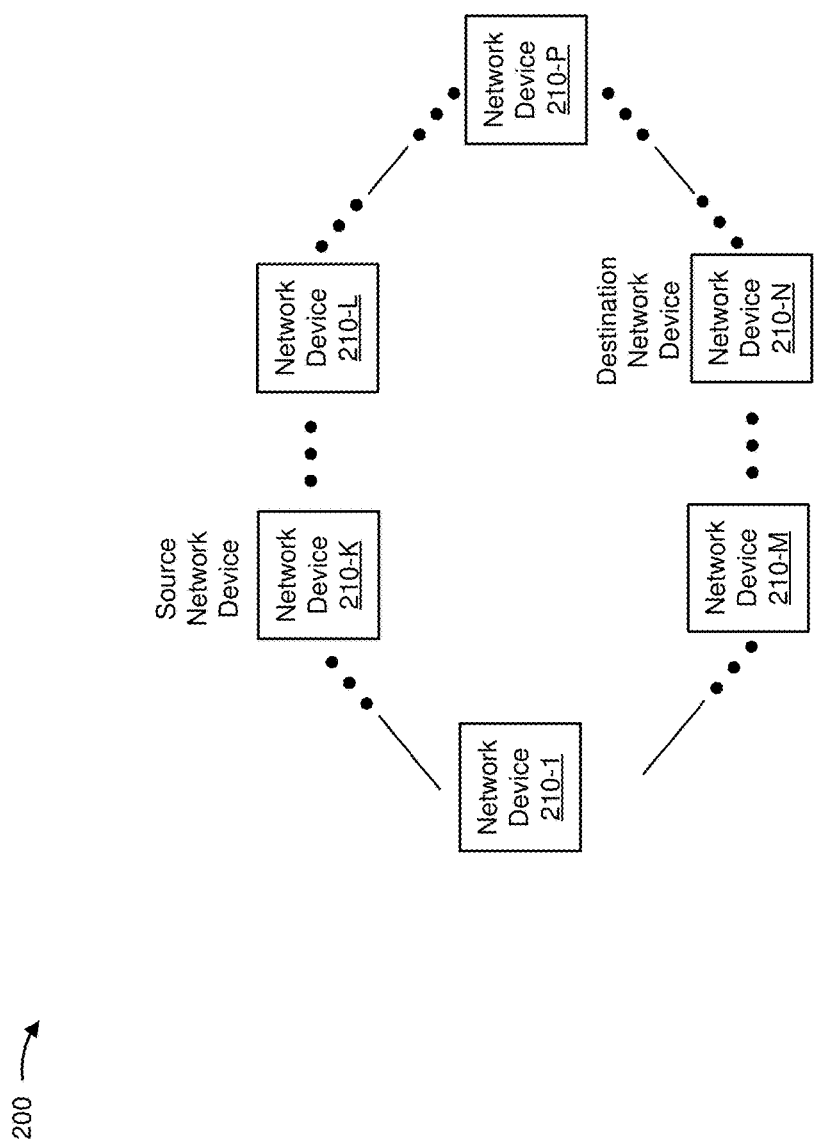
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include one or more network devices 210-1 through 210-P (P≥1) (hereinafter referred to collectively as "network devices 210," and individually as "network device 210") and one or more networks. Devices of environment 200 may interconnect via wired connections, wireless connections, or a combination of wired and wireless connections.

Network device 210 may include one or more devices capable of generating, storing, receiving, processing, and/or providing information associated with network traffic. For example, network device 210 may include a firewall, a router, a gateway, a switch, a hub, a bridge, a reverse proxy, a server (e.g., a proxy server), a computer (e.g., a desktop computer, a laptop computer, a tablet computer, etc.), a mobile device, a wearable device, or the like. In some implementations, network device 210 may capture a packet, which is being received at a connection of network device 210 (e.g., an incoming connection, an outgoing connection, or the like), for analysis. In some implementations, network device 210 may obtain information regarding a protocol layer state. For example, network device 210 may determine a value of a parameter of a connection of network device 210 when the packet is captured (e.g., simultaneous to capturing the packet, substantially simultaneous to capturing the packet, concurrent to capturing the packet, or the like). When a first network device 210 transmits one or more packets that are received by a particular network device 210, the first network device 210 may be termed a source network device 210. A second network device 210, which receives one or more network packets from the particular network device 210, may be termed a destination network device 210.

Network device 210 may be associated with one or more networks, in some implementations. Similarly, a network, of the one or more networks, may include one or more network devices 210. In some implementations, the one or more networks may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices shown in FIG. 2 is provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3A:
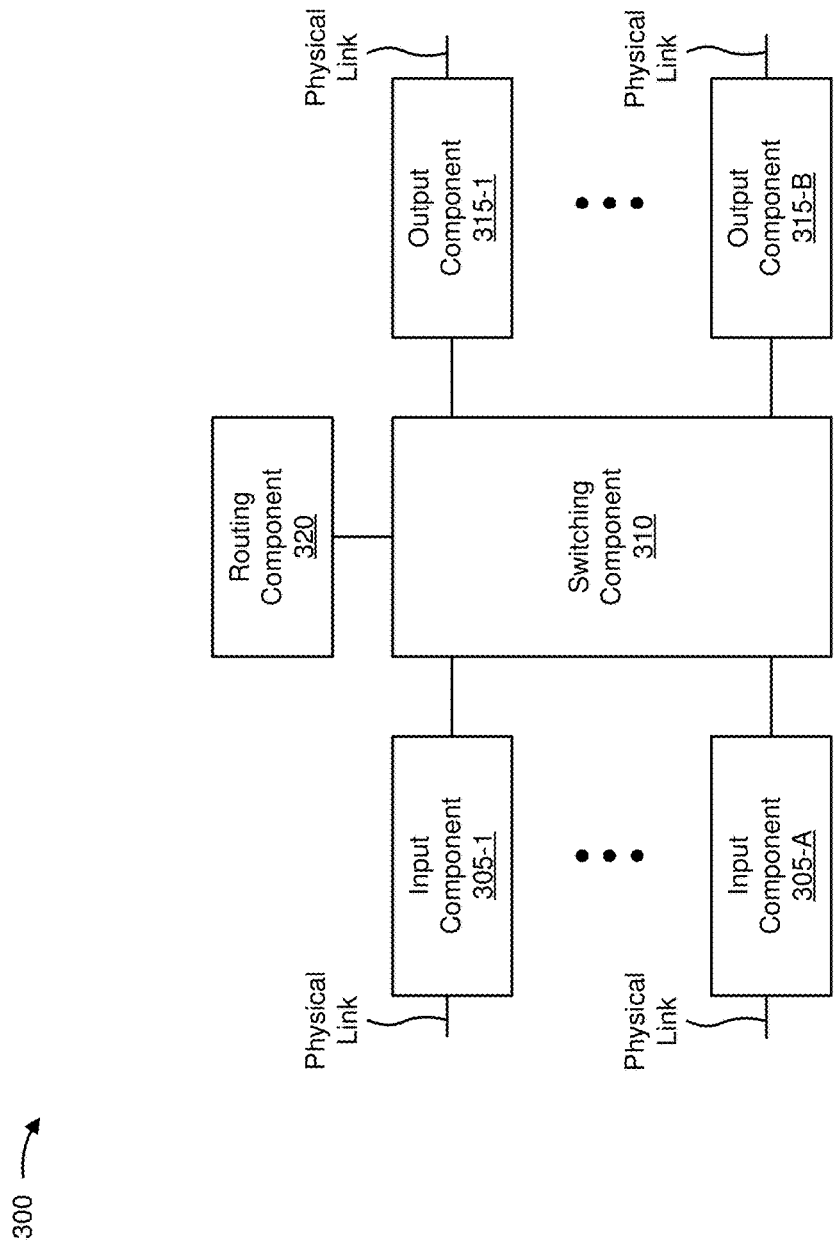
FIGS. 3A and 3B are diagrams of example components of one or more devices of FIG. 2.

FIG. 3A is a diagram of example components of a device 300. Device 300 may correspond to network device 210. In some implementations, network device 210 may include one or more devices 300 and/or one or more components of device 300. As shown in FIG. 3A, device 300 may include one or more input components 305-1 through 305-A (A≥1) (hereinafter referred to collectively as input components 305, and individually as input component 305), a switching component 310, one or more output components 315-1 through 315-B (B≥1) (hereinafter referred to collectively as output components 315, and individually as output component 315), and a routing component 320.

Input component 305 may include points of attachment for physical links and may be points of entry for traffic, such as packets. Input component 305 may process received traffic, such as by performing data link layer encapsulation or decapsulation. In some implementations, input component 305 may send packets to output component 315 via switching component 310.

Switching component 310 may interconnect input components 305 with output components 315. Switching component 310 may be implemented using one or more of multiple, different techniques. For example, switching component 310 may be implemented via busses, via crossbars, and/or with shared memories. The shared memories may act as temporary buffers to store traffic from input components 305 before the traffic is eventually scheduled for delivery to output components 315. In some implementations, switching component 310 may enable input components 305, output components 315, and/or routing component 320 to communicate.

Output component 315 may include points of attachment for physical links and may be points of exit for traffic, such as packets. Output component 315 may store packets and may schedule packets for transmission on output physical links. Output component 315 may include scheduling algorithms that support priorities and guarantees. Output component 315 may support data link layer encapsulation or decapsulation, and/or a variety of higher-level protocols. In some implementations, output component 315 may send packets and/or receive packets.

Routing component 320 may include one or more processors, microprocessors, field-programmable gate arrays (FPGAs), application-specific integrated circuit (ASICs), or similar types of processing components. In some implementations, routing component 320 may communicate with other devices, networks, and/or systems connected to device 300 to exchange information regarding network topology. Routing component 320 may create routing tables based on the network topology information, create forwarding tables based on the routing tables, and forward the forwarding tables to input components 305 and/or output components 315. Input components 305 and/or output components 315 may use the forwarding tables to perform route lookups for incoming packets.

The number and arrangement of components shown in FIG. 3A are provided as an example. In practice, device 300 may include additional components, fewer components, different components, or differently arranged components than those shown in FIG. 3A. Additionally, or alternatively, a set of components (e.g., one or more components) of device 300 may perform one or more functions described as being performed by another set of components of device 300.

Figure 3B:
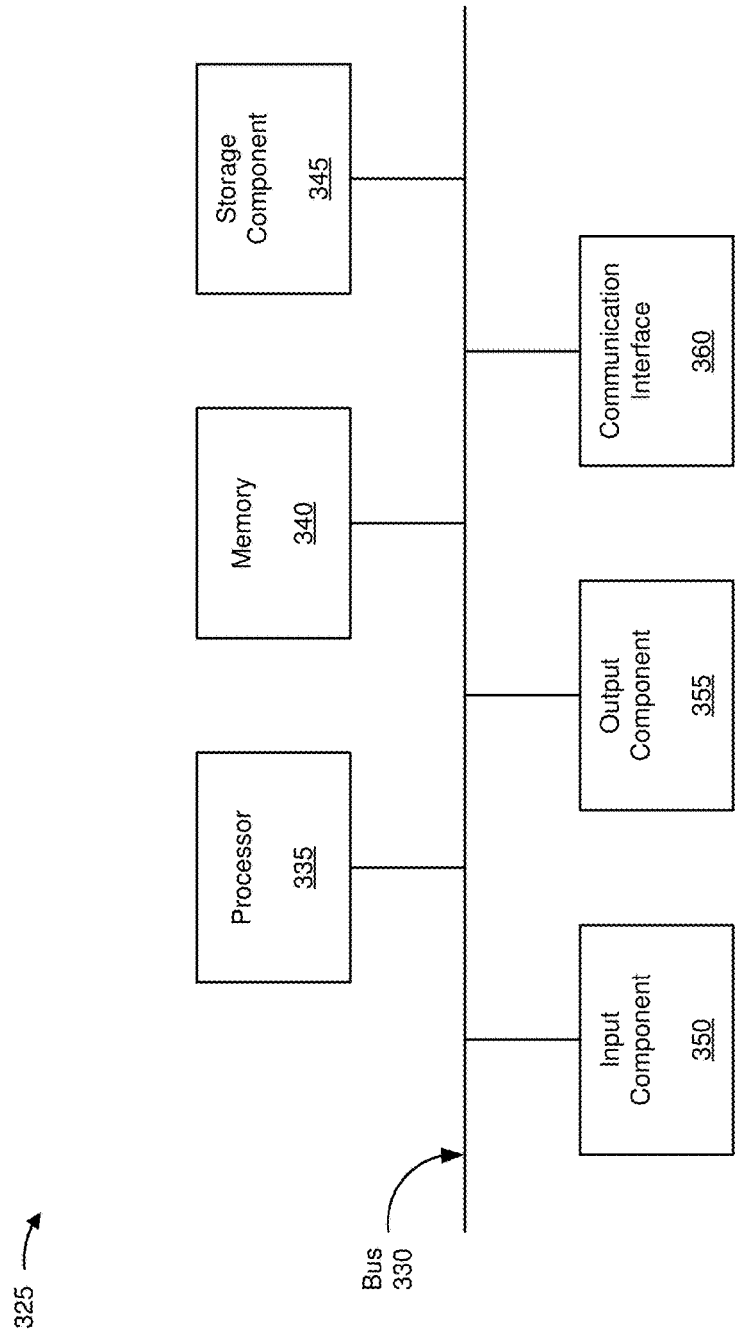

FIG. 3B is a diagram of example components of a device 325. Device 325 may correspond to network device 210. In some implementations, network device 210 may include one or more devices 325 and/or one or more components of device 325. As shown in FIG. 3B, device 325 may include a bus 330, a processor 335, a memory 340, a storage component 345, an input component 350, an output component 355, and a communication interface 360.

Bus 330 may include a component that permits communication among the components of device 325. Processor 335 is implemented in hardware, firmware, or a combination of hardware and software. Processor 335 may include a processor (e.g., a central processing unit (CPU), a graphics processing unit (GPU), an accelerated processing unit (APU), etc.), a microprocessor, and/or any processing component (e.g., an FPGA, an ASIC, etc.) that interprets and/or executes instructions. In some implementations, processor 335 may include one or more processors that are programmed to perform a function. Memory 340 may include a random access memory (RAM), a read only memory (ROM), and/or another type of dynamic or static storage device (e.g., a flash memory, a magnetic memory, an optical memory, etc.) that stores information and/or instructions for use by processor 335.

Storage component 345 may store information and/or software related to the operation and use of device 325. For example, storage component 345 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 325 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 355 may include a component that provides output information from device 325 (e.g., a display, a speaker, one or more light-emitting diodes (LEDs), etc.).

Communication interface 360 may include a transceiver-like component (e.g., a transceiver, a separate receiver and transmitter, etc.) that enables device 325 to communicate with other devices, such as via a wired connection, a wireless connection, or a combination of wired and wireless connections. Communication interface 360 may permit device 325 to receive information from another device and/or provide information to another device. For example, communication interface 360 may include an Ethernet interface, an optical interface, a coaxial interface, an infrared interface, a radio frequency (RF) interface, a universal serial bus (USB) interface, a Wi-Fi interface, a cellular network interface, or the like.

Device 325 may perform one or more processes described herein. Device 325 may perform these processes in response to processor 335 executing software instructions stored by a computer-readable medium, such as memory 340 and/or storage component 345. A computer-readable medium is defined herein as a non-transitory memory device. A memory device includes memory space within a single physical storage device or memory space spread across multiple physical storage devices.

Software instructions may be read into memory 340 and/or storage component 345 from another computer-readable medium or from another device via communication interface 360. When executed, software instructions stored in memory 340 and/or storage component 345 may cause processor 335 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3B are provided as examples. In practice, device 325 may include additional components, fewer components, different components, or differently arranged components than those shown in FIG. 3B. Additionally, or alternatively, a set of components (e.g., one or more components) of device 325 may perform one or more functions described as being performed by another set of components of device 325.

Figure 4:
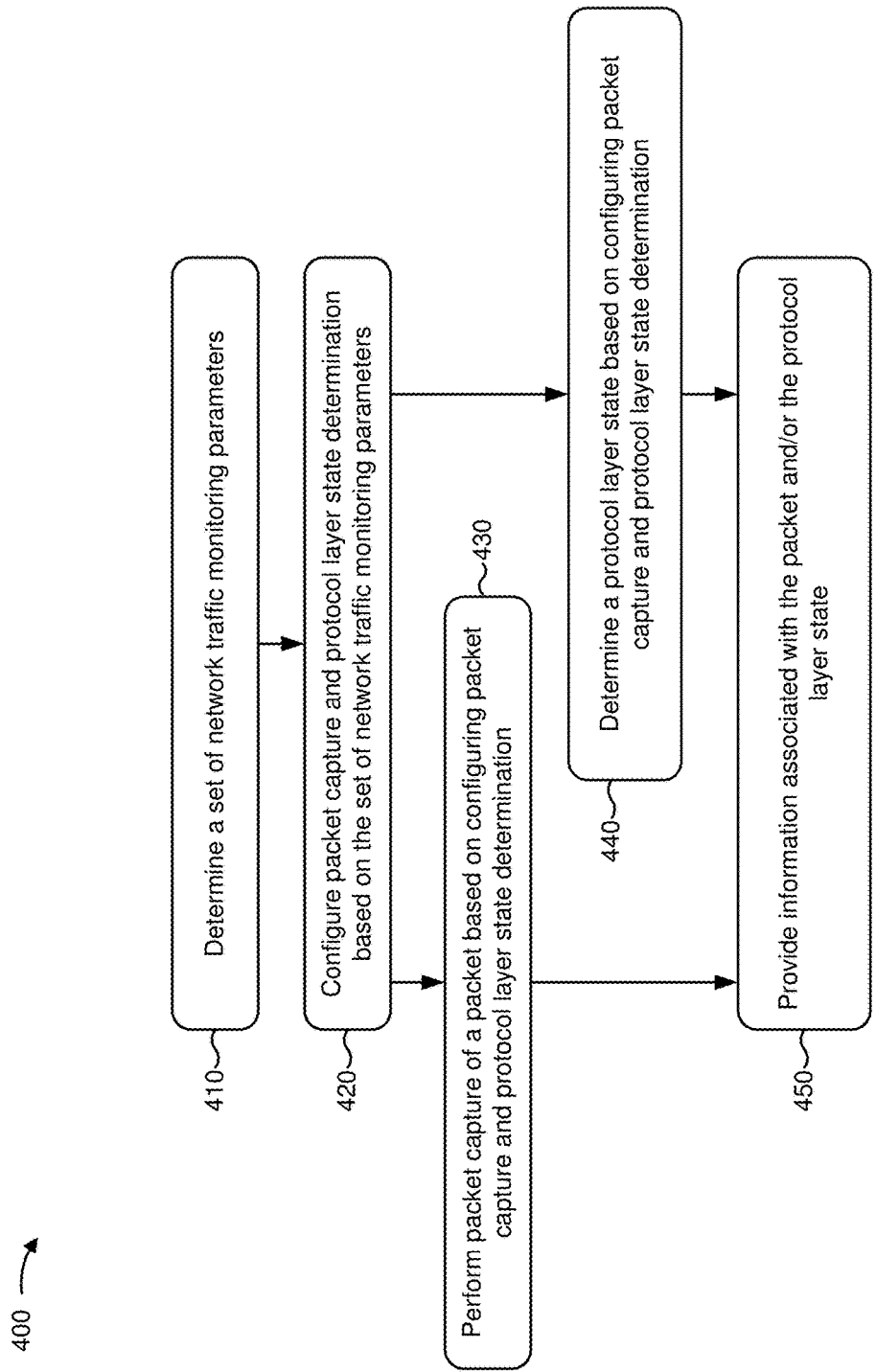
FIG. 4 is a flow chart of an example process for capturing packet information and/or information regarding a protocol layer state when a packet is captured.

FIG. 4 is a flow chart of an example process 400 for capturing packet information and/or information regarding a protocol layer state when a packet is captured. In some implementations, one or more process blocks of FIG. 4 may be performed by network device 210. In some implementations, one or more process blocks of FIG. 4 may be performed by another device or a group of devices separate from or including network device 210.

As shown in FIG. 4, process 400 may include determining a set of network traffic monitoring parameters (block 410). For example, network device 210 may determine a set of network traffic monitoring parameters. A network traffic monitoring parameter may include a parameter identifying a protocol layer at which to perform packet capture (e.g., a TCP layer, a user datagram protocol (UDP) layer, etc.), a location in the protocol layer at which to establish a hook for performing packet capture, a filter (e.g., a source port, a destination port, a source IP address, a destination IP address, etc.), or the like. In some implementations, network device 210 may determine a network traffic monitoring parameter identifying packet information that is to be captured. For example, network device 210 may determine to capture a packet, a portion of a packet (e.g., a header of a packet; a particular value included in a header of a packet, such as a destination IP address or the like; a payload of a packet; etc.), or the like.

In some implementations, network device 210 may determine one or more network traffic monitoring parameters associated with determining a protocol layer state. For example, network device 210 may determine one or more data structures, fields, or the like for which values are to be obtained when determining the protocol layer state, such as a field relating to a set of indicators active for the protocol layer (e.g., a flags field), a field relating to a state of a socket, a field relating to a type of a socket, or the like.

In some implementations, network device 210 may determine the set of network traffic monitoring parameters based on user input. For example, network device 210 may provide a user interface with which to receive the set of network traffic monitoring parameters. Additionally, or alternatively, network device 210 may determine the set of network traffic monitoring parameters based on a characteristic of network traffic being received/provided by network device 210. For example, when network device 210 is associated with providing TCP traffic to a source network device 210, network device 210 may select a TCP filter for identifying network traffic of interest (e.g., network traffic for which packet capture is to be performed). In some implementations, network device 210 may obtain a set of stored network traffic monitoring parameters. For example, network device 210 may store a set of packet capture profiles (e.g., a TCP packet capture profile including a set of network traffic monitoring parameters associated with TCP packet capture, a UDP packet capture profile including a set of network traffic monitoring parameters associated with UDP packet capture, etc.), and may select a particular packet capture profile for utilization.

As further shown in FIG. 4, process 400 may include configuring packet capture and protocol layer state determination based on the set of network traffic monitoring parameters (block 420). For example, network device 210 may configure packet capture and protocol layer state determination based on the set of network traffic monitoring parameters. In some implementations, network device 210 may establish a hook for performing packet capture when configuring packet capture. For example, based on a particular parameter of the set of network traffic monitoring parameters, network device 210 may establish a hook at a particular location in a protocol stack (e.g., a TCP stack) associated with a protocol layer (e.g., the TCP layer) at which packet capture is to occur. In some implementations, network device 210 may cause a set of connections to point to a particular block when configuring packet capture. For example, network device 210 may cause a set of TCP connections (e.g., a set of incoming process control blocks (inpcbs)) to point to a packet capture block associated with performing packet capture. In this case, network device 210 may cause the packet capture block to point to a raw socket (e.g., to which a packet is copied when the packet is received at an inpcb).

In some implementations, network device 210 may identify information that is to be obtained when the packet is captured. For example, network device 210 may identify one or more values, of a protocol layer state, that are to be determined when determining the protocol layer state when a packet is received at a connection. In some implementations, network device 210 may generate a data structure, for utilization in determining the protocol layer state, when configuring protocol layer state determination. For example, network device 210 may generate a data structure associated with storing the set of values, and may associate the data structure with the packet capture block.

In some implementations, network device 210 may associate an entry of the data structure with a corresponding memory location from which to obtain a value for the entry to configure protocol layer state determination. For example, when the data structure includes an entry that is intended to receive an inpcb flags value (e.g., a value identifying properties of a TCP connection), network device 210 may determine a location, within a data structure associated with the connection, at which the inpcb flags value is stored. In this case, network device 210 may determine a base address of the TCP connection, an offset from the base address at which the inpcb flags value is stored, or the like, and may cause the data structure to be configured to receive the inpcb flags value when the packet is captured. In this way, network device 210 causes values associated with a protocol layer state to be copied to a data structure when a packet is received at a connection, thereby permitting network device 210 to obtain the protocol layer state when the packet is received at the connection (rather than at a time when the packet is processed).

As further shown in FIG. 4, process 400 may include performing packet capture of a packet based on configuring packet capture and protocol layer state determination (block 430). For example, network device 210 may perform packet capture of the packet based on configuring packet capture and protocol layer state determination. In some implementations, network device 210 may cause a packet to be copied. For example, when a packet is received at a monitored connection (e.g., a connection for which a hook is established when configuring packet capture, such as a TCP connection or the like), network device 210 may cause the packet to be copied. In some implementations, network device 210 may cause a portion of a packet to be copied. For example, network device 210 may cause a particular amount of the packet (e.g., a quantity of bytes associated with obtaining a packet header, a quantity of bytes associated with obtaining an entire packet, or the like) to be copied to a local buffer of a packet capture block. In some implementations, network device 210 may cause a copy of a packet (or a copy of a portion of a packet), termed a copied packet, to be provided to a raw socket. For example, network device 210 may determine that the packet capture block local buffer exceeds a threshold size (e.g., a threshold quantity of bits, a threshold quantity of packets, or the like being stored via the packet capture block local buffer), and may cause the copied packet to be provided from the packet capture block local buffer to a raw socket receive buffer associated with monitoring the connection. In this case, network device 210 may read data from the raw socket receive buffer to determine information associated with the packet that is to be provided, such as packet header information, packet payload information, or the like. In this way, network device 210 performs packet capture at the protocol layer.

As further shown in FIG. 4, process 400 may include determining a protocol layer state associated with the network traffic based on configuring packet capture and protocol layer state determination (block 440). For example, network device 210 may determine the protocol layer state of a connection when a packet is received at the connection. In some implementations, network device 210 may cause a value of a field associated with a connection to be copied. For example, when network device 210 determines a location, within a data structure, at which to obtain a value for a protocol layer state (e.g., a base address, an offset to the base address, etc.), network device 210 may cause the value to be copied to a local buffer. In this case, network device 210 may determine that the local buffer exceeds a threshold (e.g., a threshold quantity of information stored via the local buffer or the like), and may cause the value to be copied to a data structure associated with storing the protocol layer state at a time when the packet is received at a connection.

In some implementations, network device 210 may obtain multiple values. For example, network device 210 may cause the data structure to obtain multiple values for the protocol layer state when a packet is received at a monitored connection. In some implementations, network device 210 may cause the multiple values to be provided to multiple data structures. For example, network device 210 may cause the multiple values to be provided from one or more local buffers to multiple data structures, which are included in a single array of objects. In this case, network device 210 may provide the array of objects as a response to a request for protocol layer state information associated with a packet being received at a monitored connection. In this way, network device 210 captures information relating to a protocol layer state when a packet is received at a particular connection, thereby facilitating debugging of errors in a configuration of network device 210, a configuration of a network, or the like.

As further shown in FIG. 4, process 400 may include providing information associated with the packet and/or the protocol layer state (block 450). For example, network device 210 may provide information associated with the packet and/or the protocol layer state when the packet was received at a connection of network device 210. In some implementations, network device 210 may provide the information (e.g., header information associated with the packet, payload information associated with the packet, a set of values associated with the connection, or the like) for display. For example, network device 210 may provide the information for display via a user interface as a response to a request for the information or based on another trigger to provide the information.

Additionally, or alternatively, network device 210 may provide the information to cause an alteration to network device 210. For example, network device 210 may provide the information, and may receive input associated with causing an alteration to a parameter, such as a parameter of the connection regarding which protocol layer state information was obtained. In this way, network device 210 causes an improvement to performance of network device 210 by providing information that more accurately reflects operation of network device 210 at a time when a packet is received at a connection, rather than information before or after the packet is received at the connection (which may be less useful in debugging errors associated with network device 210).

Additionally, or alternatively, network device 210 may determine the alteration based on the information associated with the packet and/or the protocol layer state. For example, network device 210 may determine, based on the information, an alteration associated with improving performance of network device 210, and may cause the alteration to be implemented on network device 210. In some implementations, network device 210 may cause an alteration to another network device 210, a network, or the like. For example, network device 210 may determine, based on the information associated with the packet and/or the protocol layer state, an alteration to another network device 210 to improve network performance, and may transmit a message associated with causing the alteration to be implemented at the other network device 210.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5A:
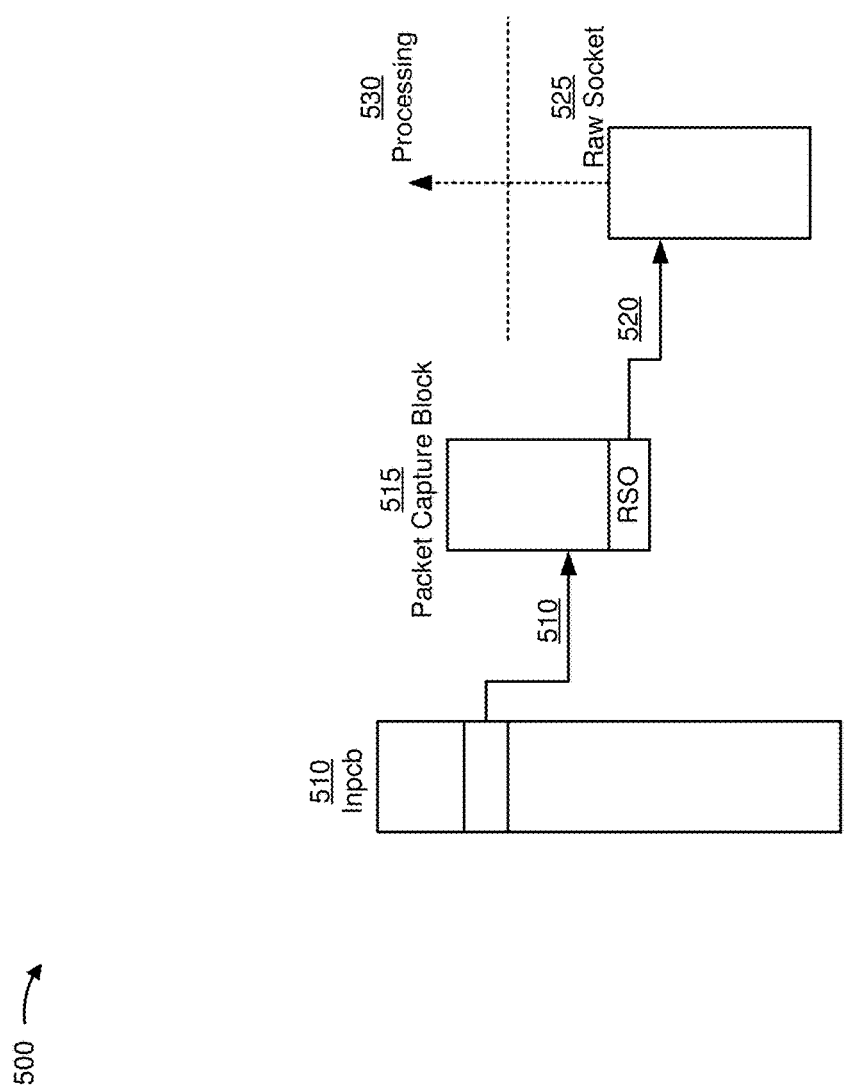
FIGS. 5A and 5B are diagrams of an example implementation relating to the example process shown in FIG. 4.
Figure 5B:
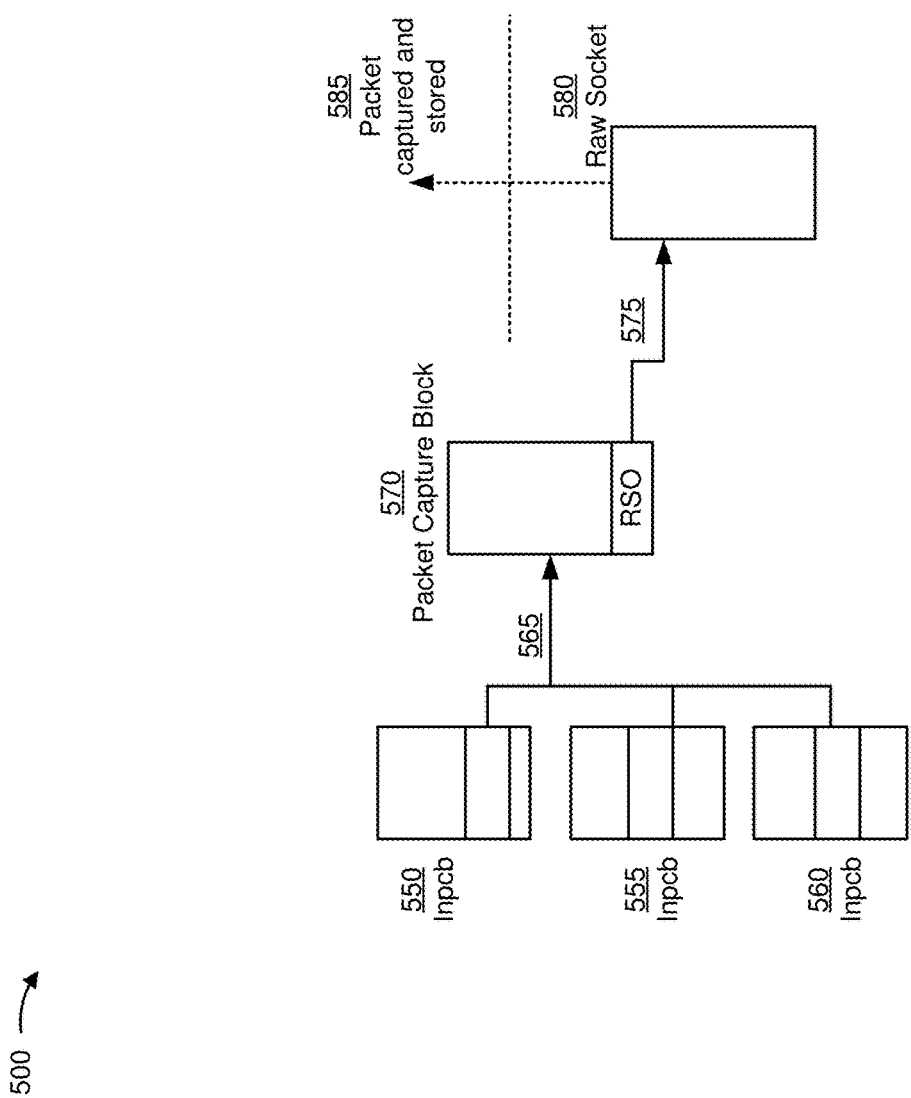

FIGS. 5A and 5B are diagrams of an example implementation 500 relating to example process 400 shown in FIG. 4. FIGS. 5A and 5B show an example framework for capturing packet information at a protocol layer.

As shown in FIG. 5A, by reference number 505, network device 210 causes inpcb 510 (e.g., a TCP connection incoming or outgoing path) to point to a packet capture block 515. As shown by reference number 520, network device 210 causes a raw socket object (RSO) of packet capture block 515 to point to raw socket 525. When network device 210 receives a packet at inpcb 510, network device 210 causes a portion of the packet (e.g., header information) to be copied to a local buffer of packet capture block 515. When network device 210 determines that the buffer satisfies a threshold size, network device 210 causes the portion of the packet to be copied to a receive buffer of raw socket 525. By maintaining the portion of the packet in the local buffer of packet capture block 515, rather than receiving the portion of the packet when the portion of the packet is copied, network device 210 reduces computing resource utilization by limiting times when computing resources are required to be assigned for packet capture and processing. As shown by reference number 530, based on copying the portion of the packet from the local buffer of packet capture block 515 to the receive buffer of raw socket 525, network device 210 causes the packet to be processed (e.g., network device 210 allocates computing resources to extract desired information, such as a packet header, a source IP address for the packet, a destination IP address for the packet, or the like).

As shown in FIG. 5B, a network device 210 includes inpcbs 550-560 (e.g., a set of TCP connection incoming or outgoing paths). As shown by reference number 565, when a set of packets are received at inpcbs 550-560, network device 210 causes information regarding a set of packets of the inpcbs 550-560 to be copied to a single local buffer of packet capture block 570 (e.g., header information for each packet of the set of packets). As shown by reference number 575, when the local buffer of packet capture block 570 exceeds a threshold size, network device 210 causes the information regarding the set of packets to be read from the local buffer of packet capture block 570 to a receive buffer of raw socket 580. As shown by reference number 585, network device 210 provides the information regarding the set of packets from the receive buffer of raw socket 580 for processing.

As indicated above, FIGS. 5A and 5B are provided merely as examples. Other examples are possible and may differ from what was described with regard to FIGS. 5A and 5B.

FIGS. 6A-6D are diagrams of an example implementation 600 relating to example process 400 shown in FIG. 4. FIGS. 6A-6D show an example framework for configuring capturing of information regarding a protocol layer state when a packet is captured.

Figure 6A:
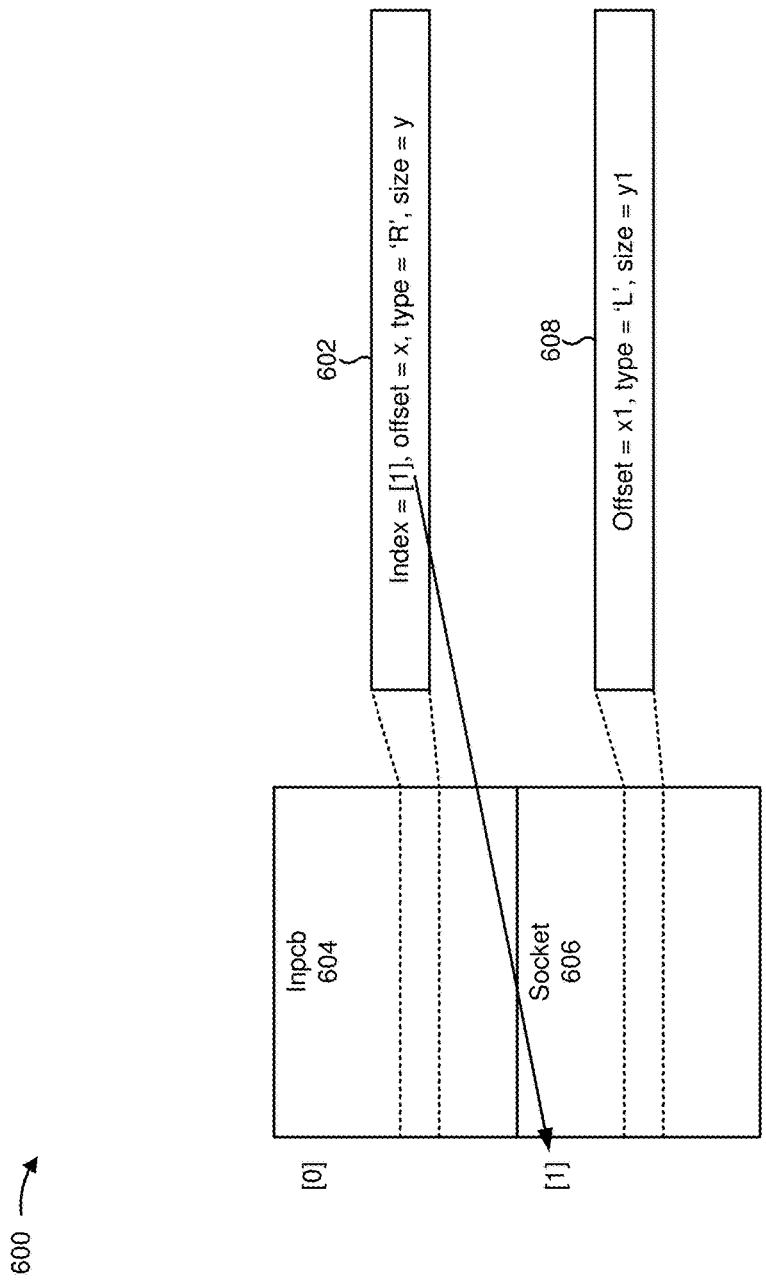
FIGS. 6A-6D are diagrams of an example implementation relating to the example process shown in FIG. 4.

As shown in FIG. 6A, network device 210 generates an entry 602 in inpcb 604 for obtaining a value of a byte count of data associated with a buffer of socket 606 (e.g., a TCP incoming or outgoing path of inpcb 604). Assume that inpcb 604 is separated from socket 606 by 1 layer of indirection. Entry 602 includes an index value (e.g., "[1]"), an offset value (e.g., "x"), a type (e.g., "R"), and a size value (e.g., "y"). Collectively, the index value, offset value, type value, and size value of entry 602 indicate that entry 602 is an indirection into socket 606, which is offset from a base address of inpcb 604. Assume that based on entry 602, network device 210 identifies a location in socket 606 referenced by inpcb 604 and identifies an entry 608. Entry 608 includes an offset value (e.g., "x1"), a type value (e.g., "L"), and a size value (e.g., "y1"). Collectively, the offset value, type value, and size value of entry 608 indicate that at a particular offset from the base address of socket 606 is located a leaf entry (e.g., an entry that does not include a set of sub-entries). Based on entries 602 and 608, network device 210 determines a location of a field from which information is to be obtained when a packet is received at inpcb 604.

Figure 6B:
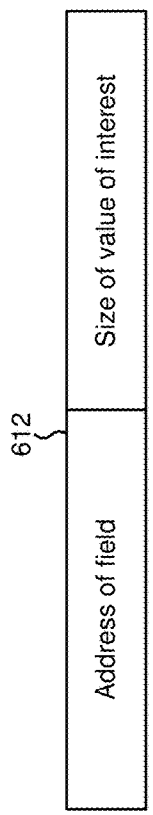

As shown in FIG. 6B, and by reference number 612, network device 210 reduces entries 602 and 608, in a kernel of network device 210, to a single entry that includes an address of the particular field from which information is to be obtained and a size of the particular field. In this way, network device 210 determines a location to which to connect a data structure for storing protocol state information when a packet is received at inpcb 604.

Figure 6C:
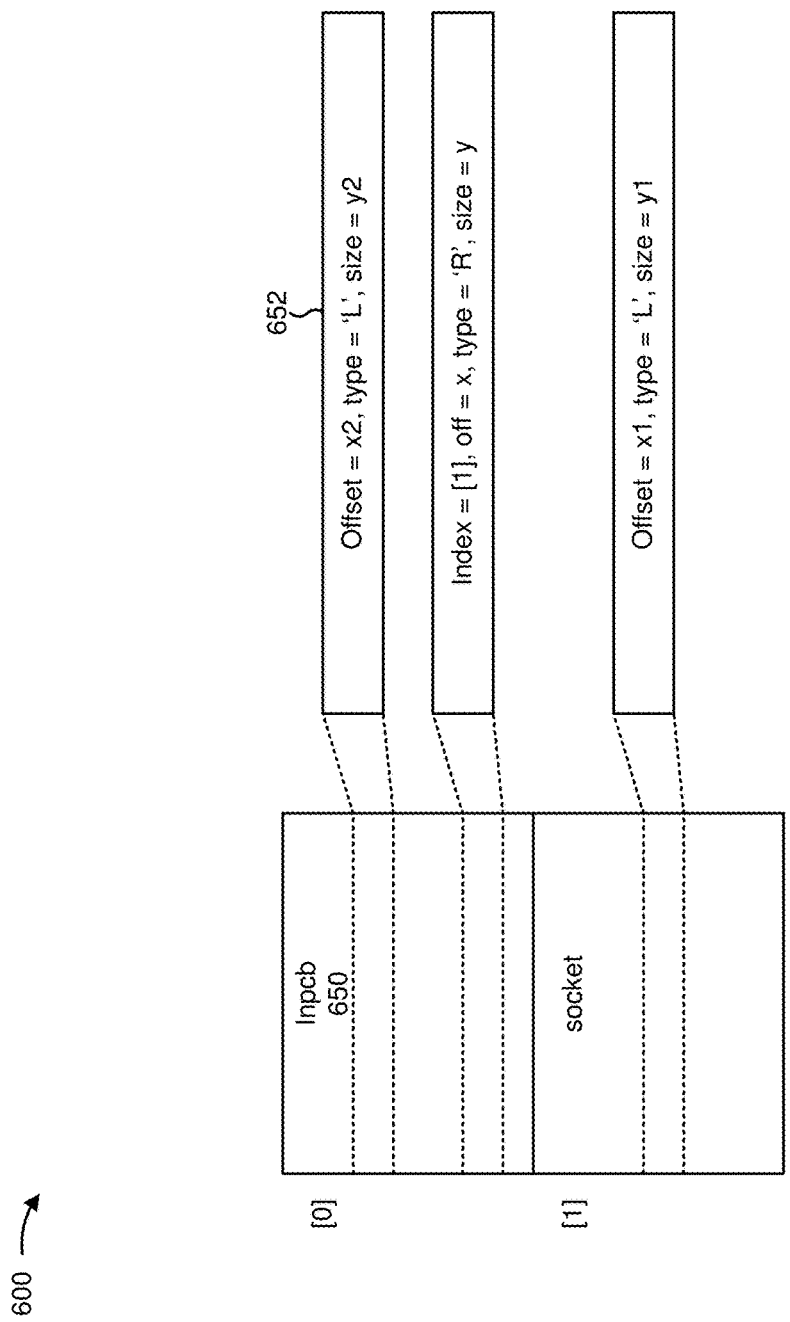

As shown in FIG. 6C, a network device 210 generates entries for obtaining multiple values associated with a protocol layer state. An inpcb 650 includes an entry 652 that includes an offset value (e.g., "x2"), a type (e.g., "L"), and a size (e.g., "y2"), collectively indicating that a referenced entry is a leaf entry located at a particular offset from a base address of inpcb 650 and with a particular size.

Figure 6D:
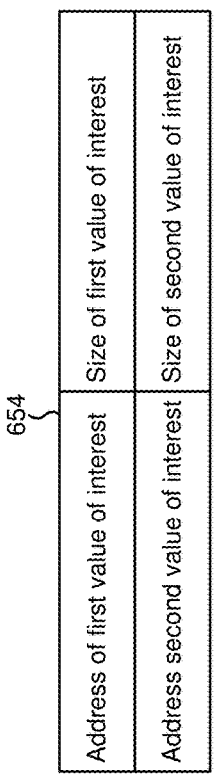
Figure 6D:

As shown in FIG. 6D, and by reference number 614, network device 210 reduces locations for the multiple values associated with the protocol layer state, in a kernel of network device 210, to a table of entries including a set of addresses of a set of values of interest and a set of sizes of corresponding fields.

As indicated above, FIGS. 6A-6D are provided merely as examples. Other examples are possible and may differ from what was described with regard to FIGS. 6A-6D.

FIG. 7 is a diagram of an example implementation 700 relating to example process 400 shown in FIG. 4. FIG. 7 shows an example of a user interface for receiving a set of network traffic monitoring parameters and providing information regarding a packet and/or protocol layer state.

With regards to FIG. 7, assume that network device 210 is configured as shown in FIGS. 5A and 5B and FIGS. 6A-6D. As shown by reference number 710, network device 210 receives input of a set of network traffic monitoring parameters via a user interface. For example, network device 210 receives input identifying a port (e.g., "port 22"), a set of protocol layer state values to be obtained (e.g., "-pstate inpcb.inp_eflags, inpcb.inp_socket.so_state, inpcb.inp_socket.so_type, . . . "). Assume that network device 210 captures two packets and simultaneously obtains a set of protocol layer state values when each packet, of the two packets, is captured. As shown by reference number 720, network device 210 provides, via the user interface, header information regarding a first packet of the two packets. As shown by reference number 730, network device 210 provides, via the user interface, protocol layer state information regarding the first packet. As shown by reference number 740, network device 210 provides, via the user interface, header information regarding a second packet of the two packets. As shown by reference number 750, network device 210 provides, via the user interface, protocol layer state information regarding the second packet.

As indicated above, FIG. 7 is provided merely as an example. Other examples are possible and may differ from what was described with regard to FIG. 7.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
a memory; and
one or more processors to:
determine a set of network traffic monitoring parameters associated with identifying a packet for capture, the set of network traffic monitoring parameters identifying a particular protocol layer at which to perform packet capture;
configure packet capture based on the set of network traffic monitoring parameters;
generate a data structure to receive an incoming process control blocks (inpcb) flag value;
configure protocol layer state determination using the data structure to receive the inpcb flag value;
perform packet capture of the packet at a time when the packet is received at the particular protocol layer in a protocol stack based on the configured packet capture and the configured protocol layer state determination,
where the one or more processors, when performing packet capture, are to:
cause a portion of the packet to be copied to a buffer, and
cause a copy of the portion of the packet to be provided from the buffer to be processed;
determine a protocol layer state at the time when the packet is received at the particular protocol layer in the protocol stack based on the configured packet capture and the configured protocol layer state determination; and
provide information identifying one or more of the packet or the protocol layer state.

2. The device of claim 1, where the one or more processors, when configuring the packet capture, are to:
establish a hook to perform packet capture at the protocol stack associated with the particular protocol layer.

3. The device of claim 1, where the one or more processors, when generating the data structure, are to:
establish the data structure to receive a set of protocol layer state values of the protocol layer state when performing the packet capture.

4. The device of claim 1, where the one or more processors, when providing the information identifying the one or more of the packet or the protocol layer state, are to:
provide, via a user interface, the information identifying the one or more of the packet and the protocol layer state.

5. The device of claim 1, where the one or more processors are further to:
receive, based on providing the information identifying the one or more of the packet or the protocol layer state, an adjustment to a configuration of the device; and
implement the adjustment to the configuration of the device.

6. The device of claim 1, where the one or more processors, when configuring the protocol layer state determination, are to:
determine a set of memory locations for a set of protocol layer state values associated with the protocol layer state; and
where the one or more processors, when determining the protocol layer state, are to:
cause the set of protocol layer state values included in the set of memory locations to be provided for storage as the protocol layer state.

7. The device of claim 1, where the particular protocol layer is a transport control protocol (TCP) layer; and
where the one or more processors, when causing the portion of the packet to be copied to the buffer, are to:
cause the portion of the packet to be copied from a TCP stack to the buffer of a packet capture block; and
where the one or more processors, when causing the copy of the portion of the packet to be provided from the buffer to be processed, are to:
determine that a quantity of information stored via the buffer satisfies a threshold quantity, and
cause the copy of the portion of packet to be provided from the buffer to be processed based on determining that the quantity of information stored via the buffer satisfies the threshold quantity.

8. The device of claim 1, where the one or more processors are further to:

provide a user interface with which to receive information identifying the set of network traffic monitoring parameters; and where the one or more processors, when determining the set of network traffic monitoring parameters, are further to:

receive the information identifying the set of network traffic monitoring parameters via the user interface.

9. A method, comprising:

determining, by a device, a set of network traffic monitoring parameters associated with identifying a packet for capture, the set of network traffic monitoring parameters identifying a particular protocol layer at which to perform packet capture;

configuring, by the device, packet capture based on the set of network traffic monitoring parameters;

generating, by the device, a data structure to receive an incoming process control blocks (inpcb) flag value;

configuring, by the device and using the data structure to receive the inpcb flag value, protocol layer state determination;

performing, by the device, packet capture of the packet at a time when the packet is received at the particular protocol layer in a protocol stack based on the configured packet capture and the configured protocol layer state determination, performing packet capture comprising:

causing a portion of the packet to be copied to a buffer, and causing a copy of the portion of the packet to be provided from the buffer to be processed; and determining, by the device, a protocol layer state of the at the time when the packet is received at the particular protocol layer in the protocol stack based on the configured packet capture and the configured protocol layer state determination.

10. The method of claim 9, further comprising:

providing information associated with the packet and the protocol layer state of the particular protocol layer based on performing the packet capture and determining the protocol layer state of the particular protocol layer.

11. The method of claim 9, where determining the protocol layer state comprises:

causing, simultaneous to the packet being received at the particular protocol layer in the protocol stack, a set of values of the protocol layer state to be provided for storage via the data structure.

12. The method of claim 9, where performing packet capture comprises:

causing a hook established at the protocol stack of the particular protocol layer to copy the portion of the packet to the buffer;

reading the portion of the packet from the buffer; and identifying information included in the portion of the packet.

13. The method of claim 9, further comprising:

causing an adjustment to a configuration of the device based on performing the packet capture and determining the protocol layer state.

14. A non-transitory computer-readable medium storing instructions, the instructions comprising:

one or more instructions that, when executed by one or more processors, cause the one or more processors to:

determine a set of network traffic monitoring parameters associated with identifying a packet for capture, the set of network traffic monitoring parameters identifying a particular protocol layer at which to perform packet capture;

configure packet capture based on the set of network traffic monitoring parameters;

generate a data structure to receive an incoming process control blocks (inpcb) flag value;

configure protocol layer state determination using the data structure to receive the inpcb flag value;

perform packet capture of the packet at a time when the packet is received at the particular protocol layer in a protocol stack based on the configured packet capture and the configured protocol layer state determination, where the one or more instructions, that cause the one or more processors to perform packet capture, cause the one or more processors to:

cause a portion of the packet to be copied to a buffer, and cause a copy of the portion of the packet to be provided from the buffer to be processed;

determine a protocol layer state at the time when the packet is received at the particular protocol layer in the protocol stack based on the configured packet capture and the configured protocol layer state determination; and provide information identifying one or more of the packet or the protocol layer state.

15. The computer-readable medium of claim 14, where the one or more instructions, that cause the one or more processors to configure the packet capture, cause the one or more processors to:

establish a hook to perform packet capture at the protocol stack associated with the particular protocol layer.

16. The computer-readable medium of claim 14, where the one or more instructions, that cause the one or more processors to generate the data structure, cause the one or more processors to:

establish the data structure to receive a set of protocol layer state values of the protocol layer state when performing the packet capture.

17. The computer-readable medium of claim 14, where the one or more instructions, that cause the one or more processors to provide the information identifying the one or more of the packet or the protocol layer state, cause the one or more processors to:

provide, via a user interface, the information identifying the one or more of the packet and the protocol layer state.

18. The computer-readable medium of claim 14, where the one or more instructions, that cause the one or more processors to configure the packet capture, cause the one or more processors to:

determine a set of memory locations for a set of protocol layer state values associated with the protocol layer state; and where the one or more instructions, that cause the one or more processors to determine the protocol layer state, cause the set of protocol layer state values included in the set of memory locations to be provided for storage as the protocol layer state.

19. The computer-readable medium of claim 14, where the particular protocol layer is a transport control protocol (TCP) layer; and where the one or more instructions, that cause the one or more processors to cause the portion of the packet to be copied to the buffer, cause the one or more processors to:
    cause the portion of the packet to be copied from a TCP stack to the buffer of a packet capture block; and
where the one or more instructions, that cause the one or more processors to cause the copy of the portion of the packet to be provided from the buffer to be processed, cause the one or more processors to:
    determine that a quantity of information stored via the buffer satisfies a threshold quantity, and cause the copy of the portion of the packet to be provided from the buffer to be processed based on determining that the quantity of information stored via the buffer satisfies the threshold quantity.

20. The computer-readable medium of claim 14, where the one or more instructions, when executed by the one or more processors, further cause the one or more processors to:
    provide a user interface with which to receive information identifying the set of network traffic monitoring parameters; and
    where the one or more instructions, that cause the one or more processors to determine the set of network traffic monitoring parameters, cause the one or more processors to:
        receive the information identifying the set of network traffic monitoring parameters via the user interface.

\* \* \* \* \*